(12) United States Patent
Dickson et al.

(10) Patent No.: US 10,023,286 B2
(45) Date of Patent: Jul. 17, 2018

(54) AIRCRAFT BAY BLANKETS THAT PROVIDE ENHANCED DRAINAGE FEATURES

(71) Applicant: The Boeing Company, Chicago, IL (US)

(72) Inventors: Jennifer Lynn Dickson, Charleston, SC (US); Jesse Vitalez Tibayan, Berkley, SC (US); Irina Alekseevna Zakharova, Daniel Island, SC (US); Mark L. Larson, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 14/945,988

(22) Filed: Nov. 19, 2015

(65) Prior Publication Data

US 2017/0144743 A1    May 25, 2017

(51) Int. Cl.
*B64C 1/00* (2006.01)
*B64C 1/06* (2006.01)
(Continued)

(52) U.S. Cl.
CPC ............. *B64C 1/067* (2013.01); *B64C 1/14* (2013.01); *B64C 1/403* (2013.01)

(58) Field of Classification Search
CPC ........... B64C 1/067; B64C 1/14; B64C 1/403; B64C 2001/081; B64C 1/068; B64C 1/12;
(Continued)

(56) References Cited

U.S. PATENT DOCUMENTS 2,324,654 A * 7/1943 Tinnerman .............. B64C 1/066
24/543
2,912,724 A * 11/1959 Wilkes .................... B64C 1/066
181/207
(Continued)

FOREIGN PATENT DOCUMENTS

DE    102006012953 A1    9/2007
DE    102010052671 A1    5/2012
(Continued)

OTHER PUBLICATIONS

AERO: Controlling Nuisance Moisture, http://www.boeing.com/commercial/aeromagazine/aero_05/m/m01/index.html, Aug. 25, 2015.
(Continued)

*Primary Examiner* — Medhat Badawi
(74) *Attorney, Agent, or Firm* — Duft Bornsen & Fettig LLP (57) ABSTRACT

Systems and methods are provided for insulation and moisture drainage. One exemplary embodiment is an apparatus comprising a bay blanket configured to insulate an aircraft. The bay blanket includes insulation, and a first waterproof lip that protrudes from the insulation in an outboard direction towards a frame of the aircraft and extends along a length of a leftward side of the bay blanket. The bay blanket also includes a second waterproof lip that protrudes from the insulation in an outboard direction towards the frame of the aircraft along a length of a rightward side of the bay blanket.

8 Claims, 12 Drawing Sheets

US 10,023,286 B2

Page 2

(51) Int. Cl.
*B64C 1/40* (2006.01)
*B64C 1/14* (2006.01)

(58) Field of Classification Search
CPC ... B64C 2001/0072; B64C 1/061; B64C 1/40; B64D 13/00; B64D 2013/0662; Y02T 50/44; Y02T 50/46; H04L 7/0337
See application file for complete search history.

(56) References Cited

U.S. PATENT DOCUMENTS

| | | | | |
|---|---|---|---|---|
| 3,077,426 A * | 2/1963 | Johnston | B29C 43/021 | 112/410 |
| 3,090,646 A * | 5/1963 | Johnson | B60J 7/123 | 160/392 |
| 3,231,944 A * | 2/1966 | Bennett | E04L 31/7666 | 116/63 P |
| 3,392,220 A * | 7/1968 | Jennings | B61D 5/04 | 220/560.15 |
| 3,740,905 A * | 6/1973 | Adams | B64C 1/067 | 165/231 |
| 3,775,921 A * | 12/1973 | Avera | E04B 1/6803 | 52/396.07 |
| 3,867,244 A * | 2/1975 | Adams | B64C 1/067 | 236/44 R |
| 4,235,398 A * | 11/1980 | Johnson | B32B 3/12 | 244/119 |
| 4,291,851 A * | 9/1981 | Johnson | B32B 3/12 | 244/119 |
| 4,308,309 A * | 12/1981 | Frosch | B64G 1/58 | 102/289 |
| 4,318,260 A * | 3/1982 | Siegel | E04D 13/1637 | 52/407.4 |
| 4,344,591 A * | 8/1982 | Jackson | B64C 1/38 | 244/132 |
| 4,488,619 A * | 12/1984 | O'Neill | B32B 27/08 | 181/288 |
| 4,869,762 A * | 9/1989 | Tonokowa | F17C 13/001 | 156/186 |
| 4,927,705 A * | 5/1990 | Syme | B32B 27/12 | 428/192 |
| 4,940,112 A * | 7/1990 | O'Neill | E04B 1/86 | 181/288 |
| 5,030,518 A * | 7/1991 | Keller | B64G 1/58 | 428/138 |
| 5,048,248 A * | 9/1991 | Ting | E04C 2/292 | 52/309.9 |
| 5,386,952 A * | 2/1995 | Nordstrom | B64C 1/067 | 244/118.1 |
| 5,398,889 A * | 3/1995 | White | B64C 1/067 | 244/119 |
| 5,472,760 A * | 12/1995 | Norvell | B32B 5/18 | 244/119 |
| 5,511,747 A * | 4/1996 | Parrot | B64G 1/58 | 244/159.1 |
| 5,545,273 A * | 8/1996 | Rasky | B32B 3/02 | 156/325 |
| 5,565,254 A * | 10/1996 | Norvell | B32B 5/18 | 428/134 |
| 5,577,688 A * | 11/1996 | Sloan | B64C 1/067 | 244/117 R |
| 5,611,504 A * | 3/1997 | Haynes | B32B 27/12 | 244/119 |
| 5,759,659 A * | 6/1998 | Sanocki | F16L 59/02 | 244/119 |
| 5,788,184 A * | 8/1998 | Eddy | B32B 5/02 | 244/119 |
| 5,792,539 A * | 8/1998 | Hunter | B32B 3/28 | 428/178 |
| 5,806,272 A * | 9/1998 | Lafond | E06B 3/66328 | 156/109 |
| 5,811,167 A * | 9/1998 | Norvell | B29C 65/02 | 428/136 |
| 5,897,079 A * | 4/1999 | Specht | B64C 1/067 | 244/118.5 |
| 6,358,591 B1 * | 3/2002 | Smith | B64C 1/40 | 428/121 |
| 6,491,254 B1 * | 12/2002 | Walkinshaw | A62C 3/08 | 244/118.5 |
| 7,040,575 B2 * | 5/2006 | Struve | B64C 1/40 | 244/118.5 |
| 7,108,227 B2 * | 9/2006 | Kunzel | B64C 1/40 | 244/119 |
| 7,946,525 B2 * | 5/2011 | Groning | B64C 1/403 | 181/294 |
| 8,016,241 B2 * | 9/2011 | Moores | B64C 1/40 | 244/119 |
| 8,157,209 B2 * | 4/2012 | Dittmar | B64C 1/066 | 244/117 R |
| 8,245,974 B2 * | 8/2012 | Paul | B64C 1/403 | 244/119 |
| 8,490,365 B2 * | 7/2013 | Mueller | B32B 3/12 | 244/123.13 |
| 8,616,498 B2 * | 12/2013 | Hossain | B32B 27/12 | 244/121 |
| 8,662,448 B2 * | 3/2014 | Weston | B64C 1/40 | 244/119 |
| 8,857,562 B2 * | 10/2014 | Morgan | B64C 1/403 | 181/284 |
| 8,882,041 B2 * | 11/2014 | Mueller | B64C 1/40 | 244/121 |
| 8,899,519 B2 * | 12/2014 | Smith | B64C 1/40 | 244/117 R |
| 9,211,945 B2 * | 12/2015 | Redecker | B64C 1/067 | |
| 9,688,383 B2 * | 6/2017 | Smith | B64C 1/40 | |
| 9,802,692 B2 * | 10/2017 | Smith | B64C 1/40 | |
| 2002/0168184 A1 * | 11/2002 | Meisiek | B64C 1/18 | 392/435 |
| 2004/0175516 A1 * | 9/2004 | Schmitz | B64C 1/067 | 428/34.1 |
| 2005/0211839 A1 * | 9/2005 | Movsesian | B64C 1/40 | 244/119 |
| 2006/0046598 A1 * | 3/2006 | Shah | B32B 3/04 | 442/394 |
| 2006/0118676 A1 * | 6/2006 | Novak | B64C 1/066 | 244/129.1 |
| 2006/0145006 A1 * | 7/2006 | Drost | B64C 1/066 | 244/118.5 |
| 2006/0194893 A1 * | 8/2006 | Prybutok | C08J 9/42 | 521/136 |
| 2006/0248854 A1 * | 11/2006 | Bartley-Cho | B32B 3/12 | 52/782.1 |
| 2006/0284014 A1 * | 12/2006 | Muller | A62C 2/06 | 244/119 |
| 2008/0302910 A1 * | 12/2008 | Calamvokis | B64C 1/067 | 244/118.5 |
| 2009/0090812 A1 * | 4/2009 | Boock | B64C 1/40 | 244/1 N |
| 2010/0199583 A1 * | 8/2010 | Behrens | B64G 1/58 | 52/396.01 |
| 2010/0240290 A1 * | 9/2010 | Markwart | B64D 13/00 | 454/71 |
| 2011/0009042 A1 * | 1/2011 | Joern | B64C 1/067 | 454/71 |
| 2011/0027526 A1 * | 2/2011 | McCarville | B29C 70/30 | 428/116 |
| 2011/0284689 A1 * | 11/2011 | Thomas | B64C 1/066 | 244/1 N |
| 2013/0161123 A1 * | 6/2013 | Morgan | E04B 1/84 | 181/175 |
| 2013/0240668 A1 * | 9/2013 | Holm | B64C 1/067 | 244/1 N |
| 2014/0189986 A1 * | 7/2014 | Carrillo | F16B 2/24 | 24/564 |
| 2015/0274278 A1 * | 10/2015 | Lucas | B64C 1/40 | 244/1 N |
| 2017/0036769 A1 * | 2/2017 | Humfeldt | B64C 1/403 | |
| 2017/0113776 A1 * | 4/2017 | Johnson | B64C 1/067 | |

(56) References Cited

U.S. PATENT DOCUMENTS

2017/0129582 A1\* 5/2017 Hitchcock ............... B64C 1/067
2017/0144743 A1\* 5/2017 Dickson .................. B64C 1/067
2017/0259901 A1\* 9/2017 Smith ....................... B64C 1/40

FOREIGN PATENT DOCUMENTS

GB 2433483 A 8/2008
WO 9500362 A1 1/1995

OTHER PUBLICATIONS

U.S. Appl. No. 14/885,041.
The Boeing Company, "787 Fuselage Insulation Requirements and Concepts," DBC_1_403Z5025-1, REV AW, Jun. 12, 2015, p. 427, section 8.16.8.
European Search Report dated Apr. 6, 2017.

\* cited by examiner

PERSPECTIVE

FIG. 12

SIDE

FIG. 13

TOP

AIRCRAFT BAY BLANKETS THAT PROVIDE ENHANCED DRAINAGE FEATURES

FIELD

The disclosure relates to the field of insulation, and in particular, to insulation for aircraft.

BACKGROUND

Aircraft may use insulation to prevent internal components from experiencing substantial temperature shifts when the aircraft changes elevation between landing and flight. The insulation also helps during sustained flight at flight altitude, and while the aircraft is located on the ground in hot weather or cold weather. For example, aircraft insulation in a cabin of a passenger aircraft ensures that passengers remain comfortable even when the temperature outside the aircraft varies substantially.

While an aircraft is in flight, moisture rises from the aircraft cabin and penetrates through insulation in the aircraft. The moisture then condenses out of the air and freezes to form ice crystals on the inside surface of the skin of the aircraft. When the skin of the aircraft is exposed to above-freezing temperatures, the ice crystals can melt. The water drips off of the skin of the aircraft and onto insulation blankets. There are penetrations/holes in the insulation blankets. Hence, the water running on top of the insulation can leak through these penetrations and drip onto the cabin interior, including ceilings and stowage bins. If this water gets past the ceilings and stowage bins, it can drip into the passenger cabin or cargo area, which is undesirable.

SUMMARY

Embodiments described herein enhance aircraft insulation by providing enhanced drainage features for aircraft bay blankets that insulate bays within the frame of an aircraft. The bay blankets described herein include tabs/protrusions/lips that are capable of substantially preventing water from flowing sideways off of the bay blanket. This ensures that water that drips onto the bay blanket from the skin of an aircraft follows the contours of the bay blanket and is directed away from the aircraft cabin. In short, dripping moisture is trapped by the bay blanket and drains along drainage channels defined by the bay blanket without entering the aircraft cabin.

One exemplary embodiment is an apparatus comprising a bay blanket configured to insulate an aircraft. The bay blanket includes insulation, and a first waterproof lip that protrudes from the insulation in an outboard direction towards a frame of the aircraft and extends along a length of a leftward side of the bay blanket. The bay blanket also includes a second waterproof lip that protrudes from the insulation in an outboard direction towards the frame of the aircraft along a length of a rightward side of the bay blanket.

A further exemplary embodiment is an apparatus that includes a frame of an aircraft and a bay blanket. The bay blanket includes insulation and a first waterproof lip that protrudes from the insulation in an outboard direction towards the frame and extends along a length of a leftward side of the bay blanket. The bay blanket also includes a second waterproof lip that protrudes from the insulation in an outboard direction towards the frame and extends along a length of a leftward side of the bay blanket. The apparatus further includes fixation elements that affix each waterproof lip of the bay blanket to the frame, and fixation elements that affix a center of the bay blanket to the frame. The bay blanket hangs from the fixation elements to form a dual-gutter pathway for channeling water in the aircraft.

A further embodiment is a method of draining water for an aircraft. The method includes receiving water along an outboard surface of a bay blanket comprising insulation. The method further includes deflecting water traveling laterally across the bay blanket back towards a center of the bay blanket (e.g., by use of waterproof lips that protrude from the insulation in an outboard direction towards a frame of the aircraft and extend along left and right sides of the insulation). Additionally, the method includes draining the water along the outboard surface of the bay blanket downward towards a drain of the aircraft.

A further embodiment is a method that includes selecting a bay blanket, orienting waterproof lips of the bay blanket towards an outboard portion of an aircraft, and affixing the bay blanket to a frame of the aircraft, thereby enabling the bay blanket to hang from the frame and form a gutter for draining water.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
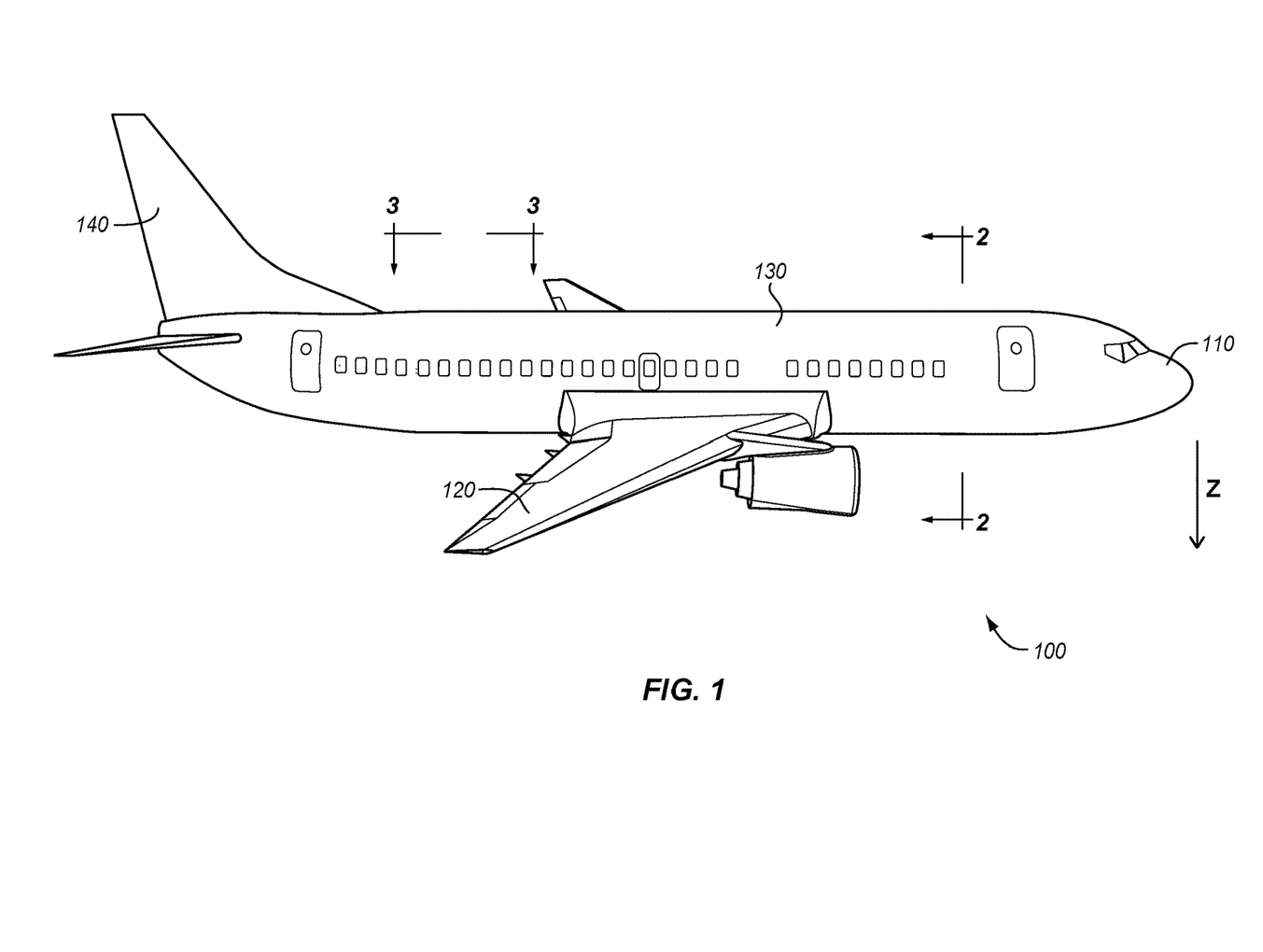
FIG. 1 is a diagram of an aircraft in an exemplary embodiment.

FIGS. 1-4 illustrate moisture flow in an exemplary aircraft, while FIGS. 5-14 illustrate systems that reduce the potential for condensed moisture to enter the cabin of an exemplary aircraft. FIG. 1 is a diagram of an aircraft 100 in an exemplary embodiment. Aircraft 100 includes nose 110, wings 120, fuselage 130, and tail 140. FIG. 1 also illustrates a downward direction (Z) indicating the expected direction in which the force of gravity will pull liquid water on aircraft 100.

Figure 2:
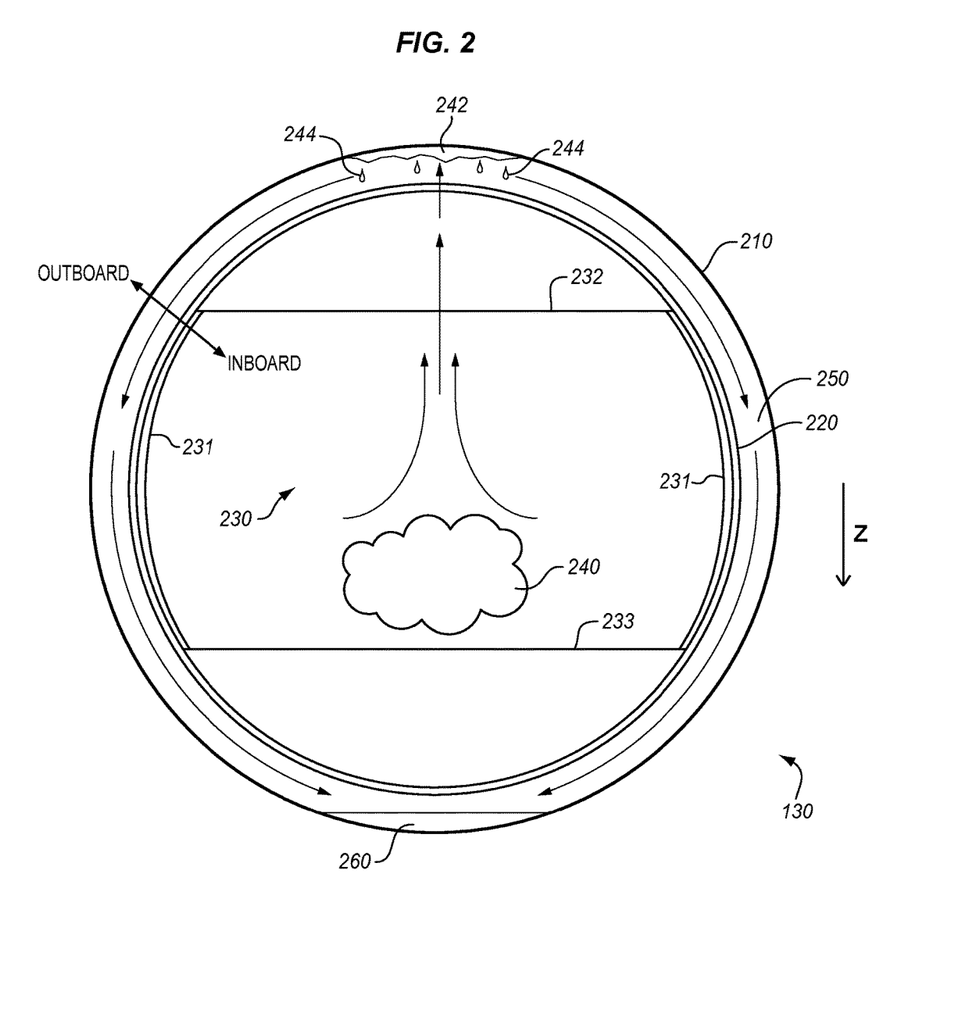
FIG. 2 is a diagram illustrating moisture flow in an aircraft in an exemplary embodiment.

FIG. 2 is a cross-section view of aircraft 100 indicated by view arrows 2 in FIG. 1. FIG. 2 illustrates a circular portion of aircraft fuselage 130. Fuselage 130 includes floor 233, ceiling 232, and sidewalls 231. As shown in FIG. 2, an outboard direction proceeds towards an external surface of aircraft 100. An inboard direction proceeds towards the interior of aircraft 100. Passengers in aircraft 100 may congregate in cabin 230 during flight. Inside of fuselage 130 (e.g., in cabin 230), passenger respiration and other sources of water cause moisture 240 to enter the air in cabin 230. For example, warm exhaled air includes moisture 240 and rises upward. Some of this air rises through ceiling 232. Furthermore, some warm air continues to rise upward through insulation 220 into a space 250 between insulation 220 and aircraft skin 210.

At high altitude, skin 210 is cooled by the outside air to below freezing temperatures. This causes water to condense out of the air and freeze onto skin 210 as ice 242. Ice 242 melts into water droplets 244 upon aircraft 100 descending to for landing. These droplets 244 travel through space 250 into drainage channel 260. Other water droplets 244 may pass through insulation 220 and drip from ceiling 232 onto passengers. This is undesirable for the passengers and causes discomfort. The size of space 250 has been substantially exaggerated in FIG. 2 in order to highlight the path through which droplets 244 are intended to travel.

Figure 3:
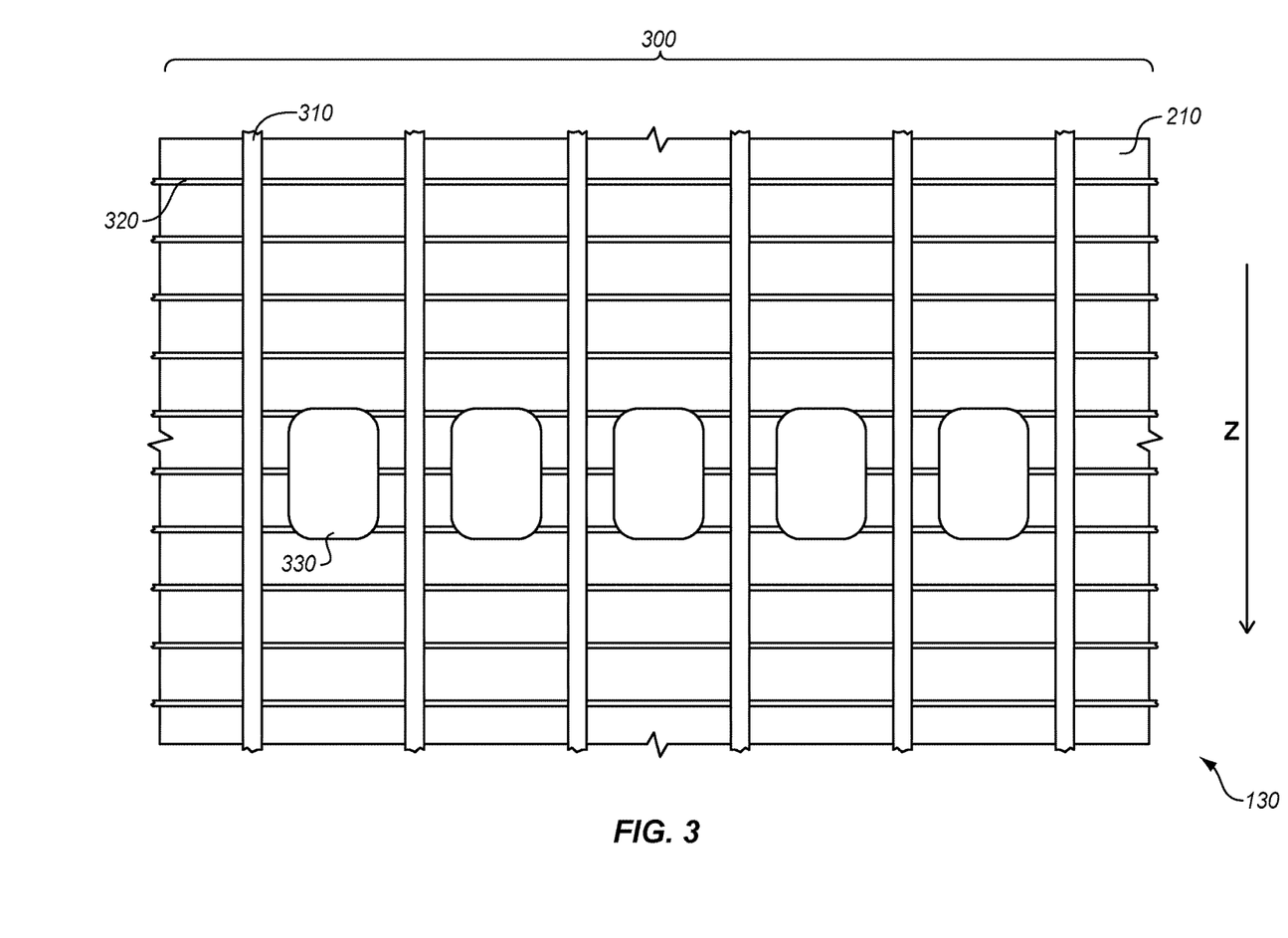
FIG. 3 is a diagram illustrating section of aircraft fuselage in an exemplary embodiment.

FIG. 3 is a diagram illustrating a section of frame 300 of fuselage 130 of aircraft 100 in an exemplary embodiment. FIG. 3 is a view shown by view arrows 3 in FIG. 1. In FIG. 3, various structural components (310, 320, 330, 210) are illustrated without insulation for clarity. Frame 300 includes stringers 320 and frame elements 310. Stringers 320 connect frame elements 310 (e.g., ribs of the aircraft) together. Windows (e.g., window 330) penetrate through skin 210.

Figure 4:
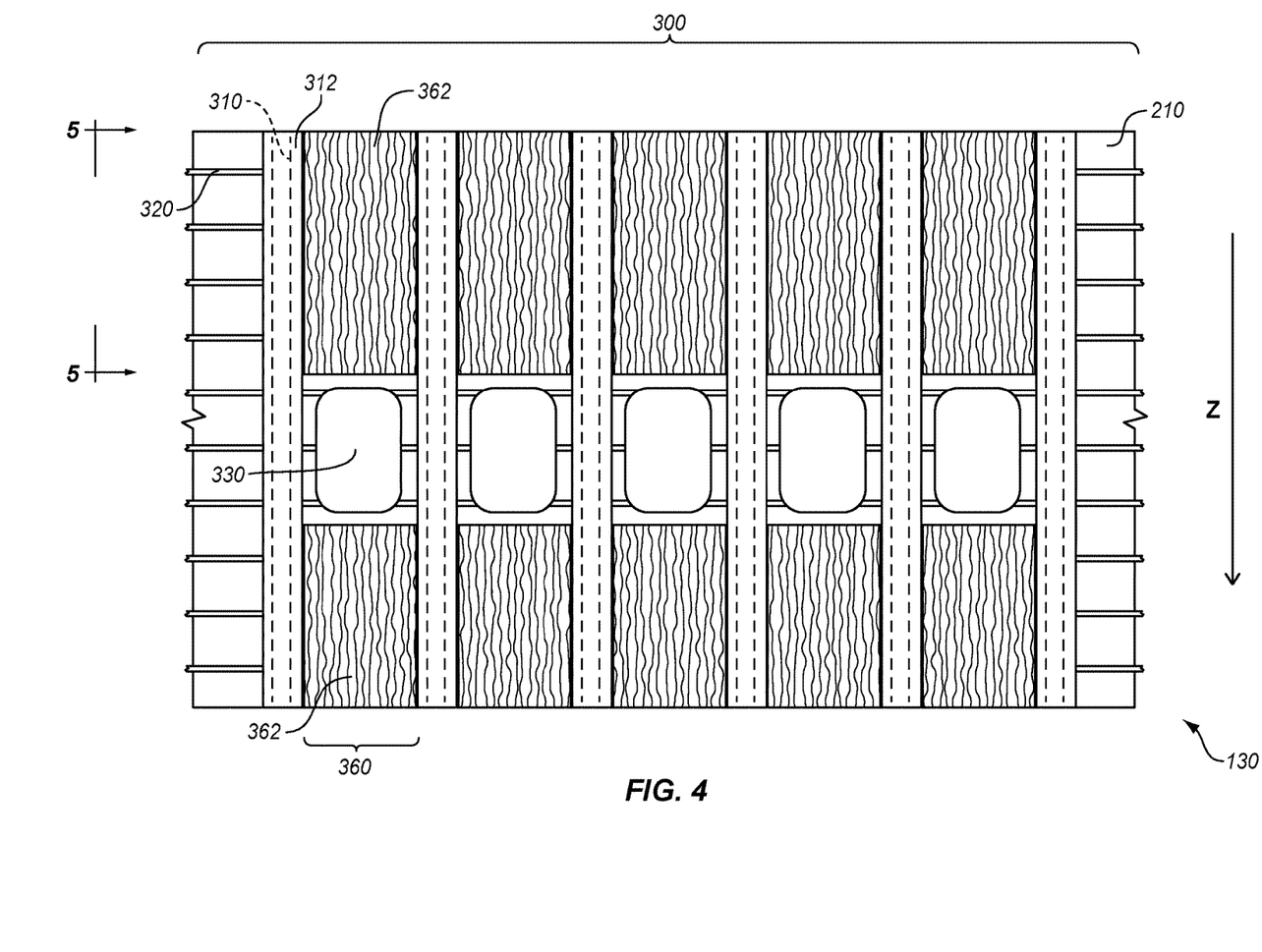
FIG. 4 is a diagram illustrating section of insulated aircraft fuselage in an exemplary embodiment.

FIG. 4 is a diagram illustrating section 300 of fuselage 130 with insulation in an exemplary embodiment. FIG. 4 also utilizes the view shown by view arrows 3 in FIG. 1. In FIG. 4, the various structural components (310, 320, 330, 210) depicted in FIG. 3 are now insulated. As shown in FIG. 4, each frame element 310 is covered by an insulating liner 312. Furthermore, bays 360 formed between frame elements 310 are filled with insulating bay blankets 362. Bay blankets 362 are waterproof (e.g., impermeable to water, such that water cannot cross directly through the material of bay blankets 362 from either the cabin 230 of aircraft 100 to skin 210, or from skin 210 of aircraft 100 to cabin 230). Bay blankets 362 are also thermally insulating. This ensures that passengers within aircraft 100 do not experience substantial temperature drops when aircraft 100 travels at cruising altitude. This also ensures that liquid water does not permeate through bay blankets 362 when flowing along an outboard portion of (e.g., the backside/outside of) bay blankets 362.

Figure 5:
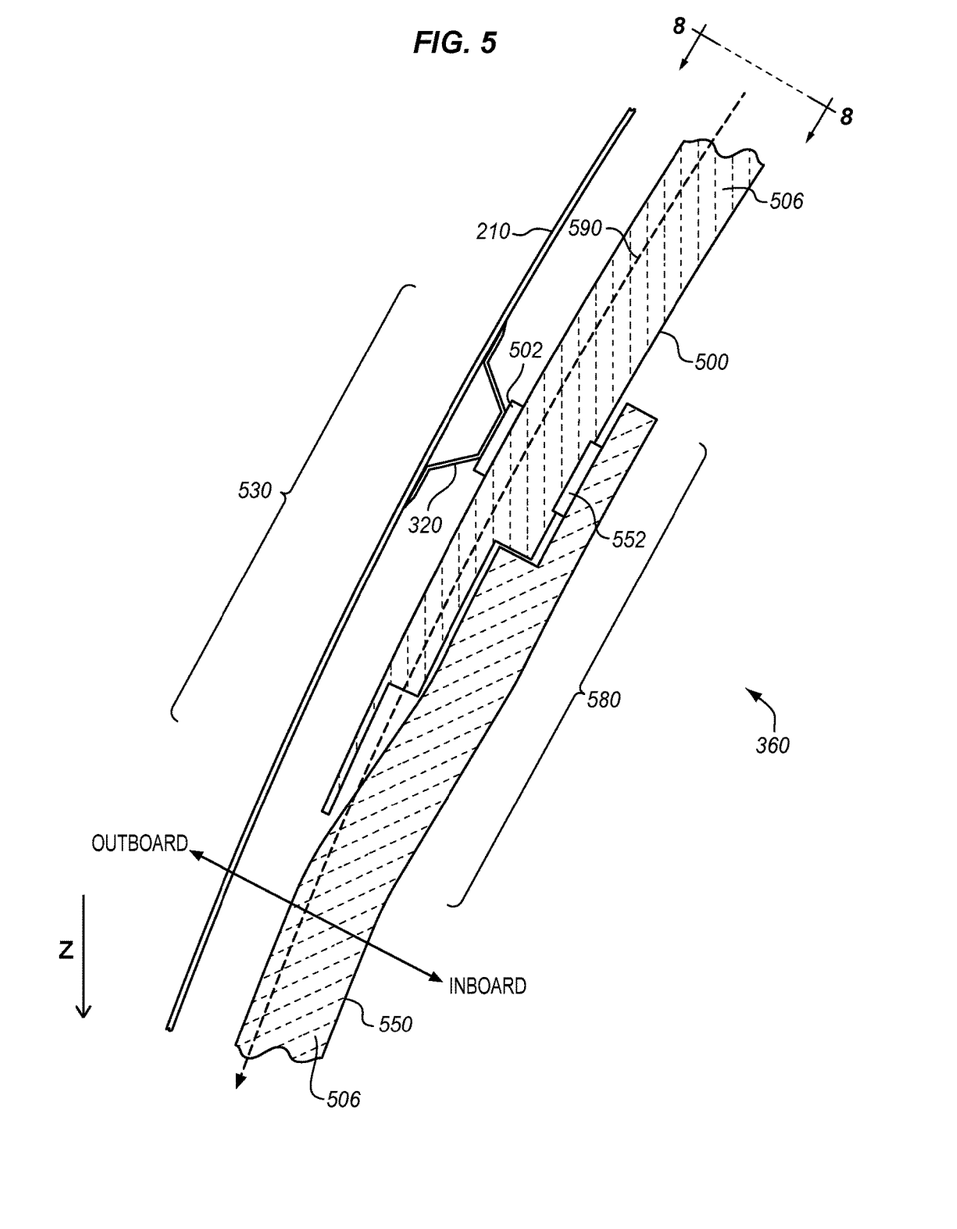
FIG. 5 is a side view of overlapping bay blankets of an aircraft in an exemplary embodiment.

FIG. 5 is a diagram illustrating a portion of a bay 360 situated at the top of aircraft 100, as shown in reference number 5 of FIG. 4. According to FIG. 5, bay blanket 500 and bay blanket 550 partially overlap/shingle over each other to form a drainage channel 590 for liquid water to flow down. Bay blankets 500 and 550 are each made of an insulating and waterproof material 506. Furthermore, portion 530 of bay blanket 500 overlaps portion 580 of bay blanket 550 such that lower portion 530 of bay blanket 500 is "shingled" over (i.e., outboard with respect to) upper portion 580 of bay blanket 550. In this manner, bay blankets 500 and 550 are "shingled" to ensure that water does not leak when draining from one bay blanket to the next.

FIG. 5 further illustrates that bay blankets 500 and 550 are affixed to stringer 320 via fixation elements 502 and 552. Bay blanket 500 is directly attached to stringer 320 via fixation element 502. In contrast, bay blanket 550 is attached to stringer 320 indirectly via fixation element 552. Fixation elements 502 and 552 may comprise any suitable fasteners and/or adhesives, although it may be desirable for fixation elements 550 and 552 to provide for waterproof methods of attachment that do not result in leaks/punctures at a bay blanket (e.g., 500, 550). Fixation elements described herein may comprise mated combinations of hook-and-loop fabric tape, waterproof tape such as BMSS-157 Type 1 Class 3 Grade E Form 1 tape, snaps, other adhesive tapes, screws and/or nails, studs, rivets, etc.

Figure 6:
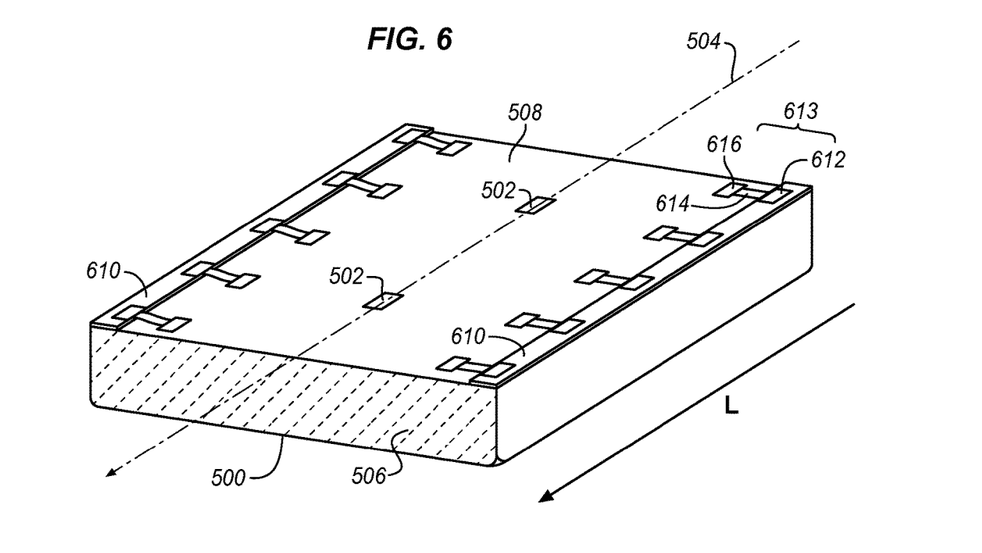
FIG. 6 illustrates a bay blanket in a resting configuration in an exemplary embodiment.

FIG. 6 illustrates a bay blanket 500 in a resting configuration in an exemplary embodiment. An outboard surface 508 of bay blanket 500 is shown in detail. Fixation elements 502 are located along the center line 504 of bay blanket 500 at outboard surface 508. Furthermore, as shown in FIG. 6, bay blanket 500 includes a leftward lip 610 and a rightward lip 610, both of which are waterproof and extend along a length (L) of blanket 500. Each lip 610 includes multiple strips 613 that extend from lips 610 towards insulation 506. Each strip 613 comprises a fixation element 612 capable of attaching bay blanket 500 to one or more stringers 320, a tensile portion 614 configured to resist tension from the weight of bay blanket 500, and a fixation element 616 that is attached to insulation 506.

Figure 7:
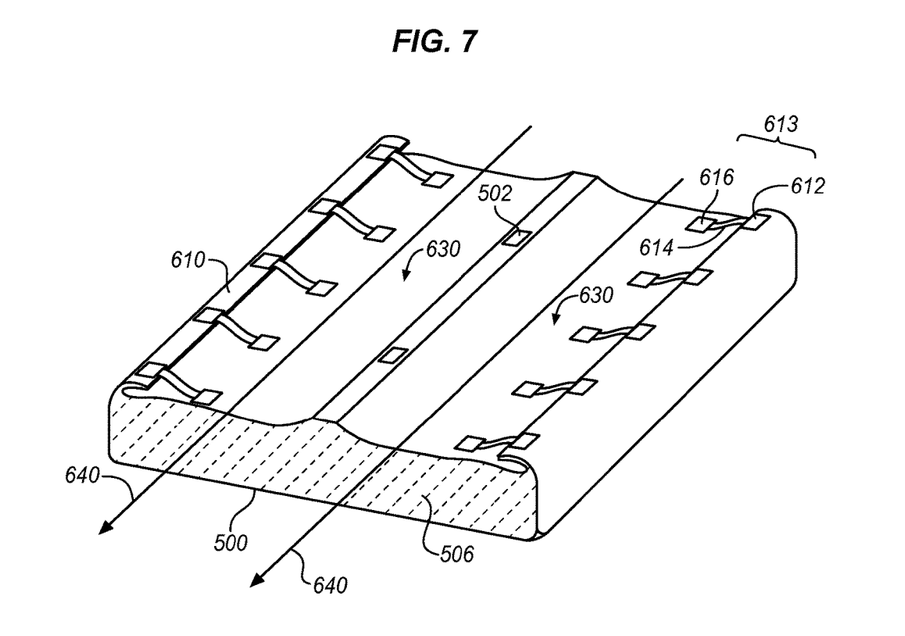
FIG. 7 illustrates a bay blanket hanging from fixation elements in an installed configuration in an exemplary embodiment.

FIG. 7 illustrates bay blanket 500 hanging from fixation elements (612, 502) in an installed configuration in an exemplary embodiment. This figure illustrates the role of strips 613 in preserving the shape of lips 610. As shown in FIG. 7, when bay blanket 500 is hung by its own weight from fixation elements 612 and 502, it partially deforms, resulting in dual troughs/gutters 630 through which water 640 may drain. Strips 613 are drawn taught by the weight of hanging insulation 506. This ensures that lips 610 are properly oriented to deflect any water that would otherwise leak off of the side of bay blanket 500.

Figure 8:
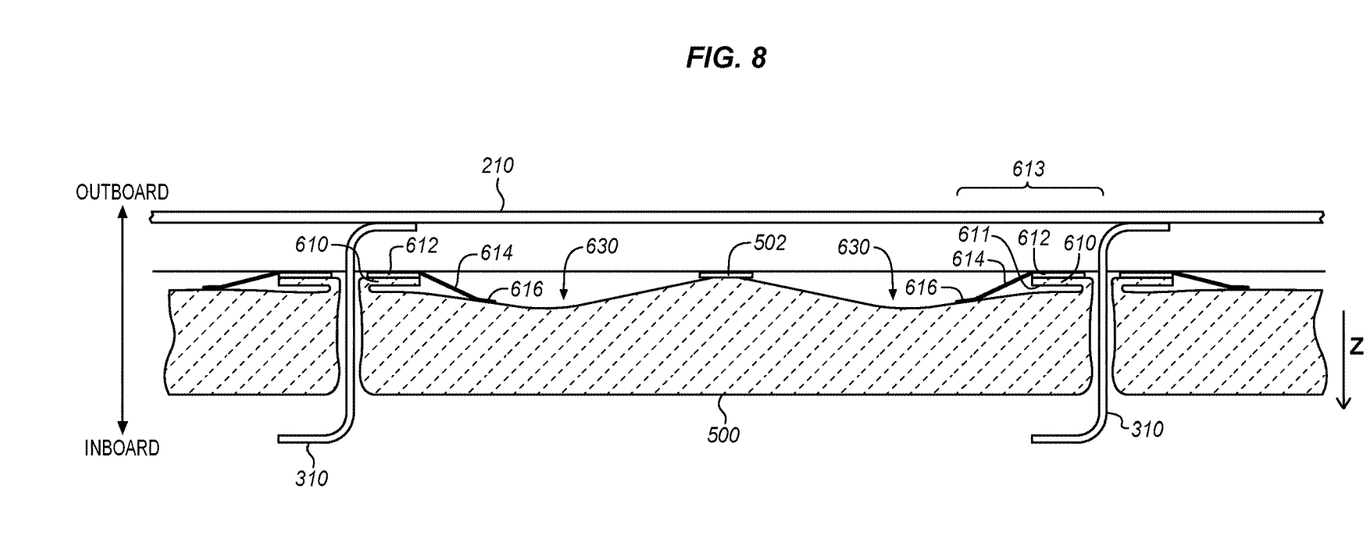
FIG. 8 illustrates a cut-through front view of an installed bay blanket in an exemplary embodiment.

FIG. 8 illustrates a cut-through front view of an installed bay blanket in an exemplary embodiment. In this embodiment each bay blanket is hung between intervening frame elements 310 which are attached to aircraft skin 210. In FIG. 8, gutters 630 are illustrated as bay blanket 500 hangs by its own weight from fixation elements 502 and 612. Lips 610 each include an overhang 611, which is more clearly visible in this view. Overhang 611 prevents water from spilling over lips 610 and leaking out of the sides of bay blanket 500.

Figure 9:
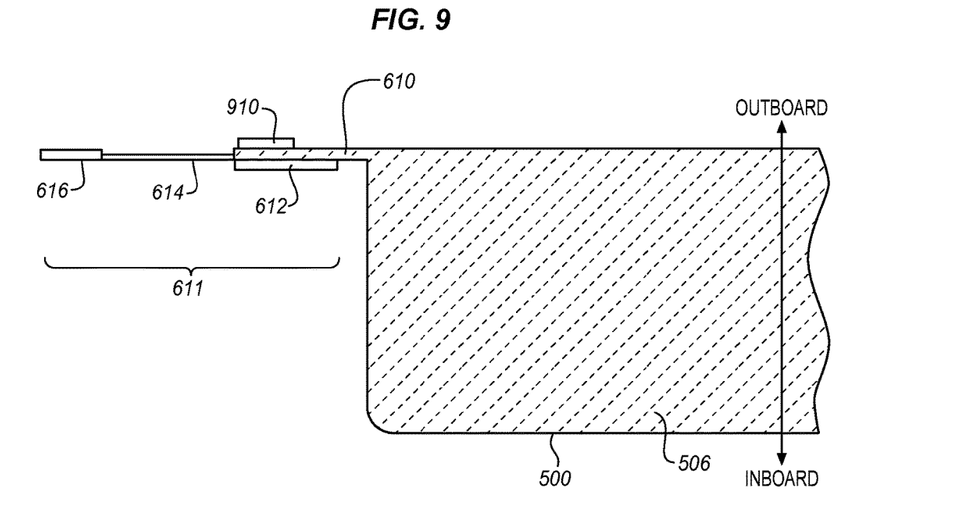
FIG. 9 is a cut-through diagram illustrating unfolded lips of a bay blanket in an exemplary embodiment.
Figure 10:
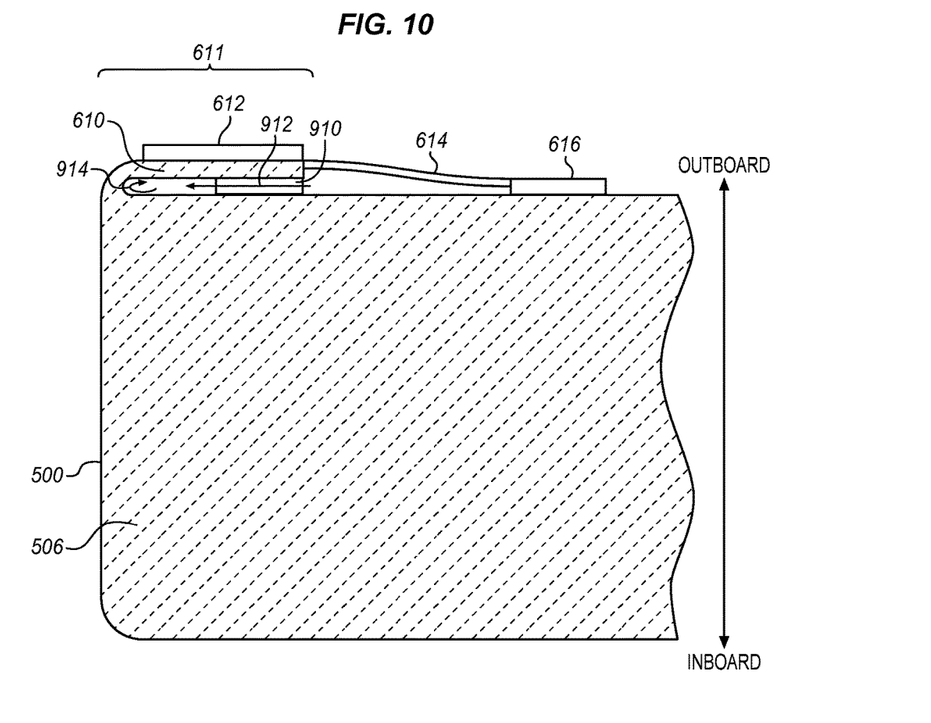
FIG. 10 is a cut-through diagram illustrating unfolded lips of a bay blanket in an exemplary embodiment.

FIG. 9 is a cut-through diagram illustrating unfolded lips of bay blanket in 500, while FIG. 10 is a cut-through diagram illustrating unfolded lips of bay blanket 500. FIG. 9 shows that when bay blanket 500 is first fabricated, fixation elements 616 of strips 613 have not yet been affixed to insulation 506. The fixation elements 616 are then affixed as shown in FIG. 10. This ensures that lips 610 will not "flop" into an open configuration or otherwise lose their utility while in transit. Strips 613 also ensure that installation of blanket 500 is an easier process, because lips 610 will not lose their shape during installation or otherwise require micromanagement by a technician.

FIGS. 9-10 also illustrate channeling elements 910. Channeling elements 910 provide structural support while also allowing water to flow through them. For example, channeling elements 910 may comprise loop fabric tape attached to lips 610. Such a fabric may resist some amount of compression while also defining numerous small, semi-random channels (e.g., porous openings exhibited by porous materials). These channels allow liquid water 912 to travel through channeling element 910. Channeling element 910 also ensures that if an overhang 611 sags, bows, or dips into contact with insulation 506, water will travel through channeling element 910 and rebound off of lip 610 underneath overhang 611 instead of damming at lip 610 and then flowing over lip 610. This process of water 912 flowing through channeling element 910 and rebounding off 914 of lip 610 is illustrated on the right side of FIG. 10.

Figure 11:
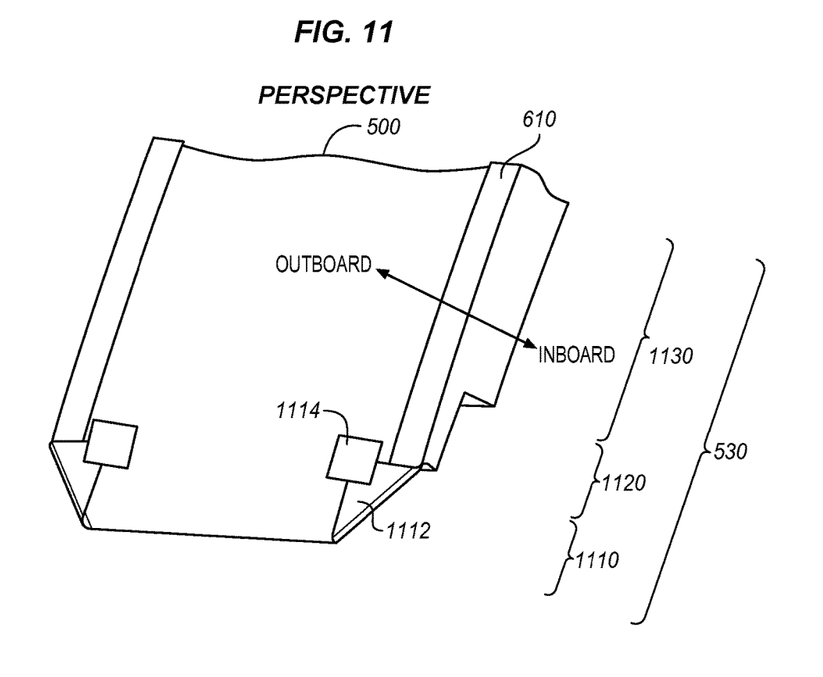
FIGS. 11-13 illustrate a lower portion of a bay blanket in an exemplary embodiment.
Figure 12:
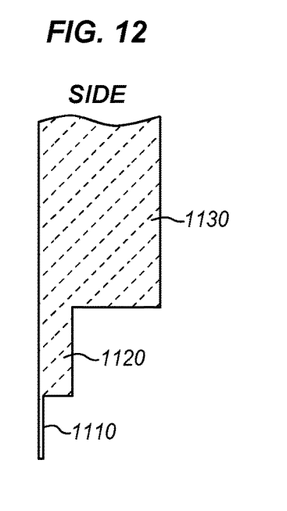
Figure 13:
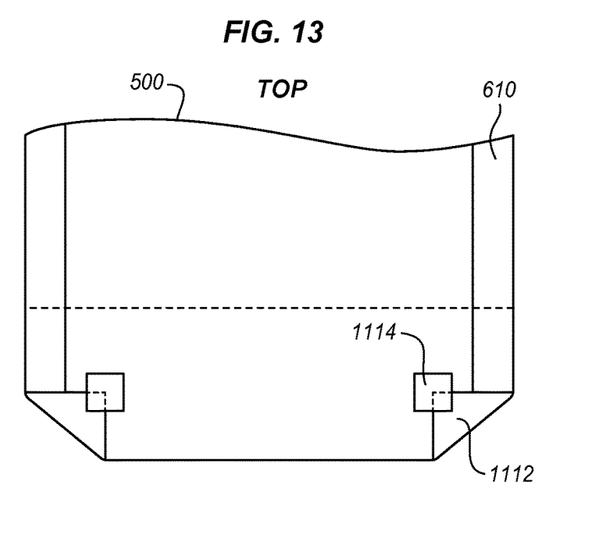

FIGS. 11-13 illustrate a lower portion 530 of a bay blanket 500 in an exemplary embodiment. In this embodiment lower portion 530 is divided into regions 1110, 1120, and 1130, which overlap corresponding portions of another bay blanket (as shown in FIG. 5). Lower region 610 includes corners 1112, which are folded back onto bay blanket 500 towards a center of bay blanket 500 and affixed to bay blanket 500 by fixation elements 1114. Fixation elements 114 may comprise a waterproof tape such as BMSS-157 Type 1 Class 3 Grade E Form 1 tape. Affixing and configuring tabs in this manner ensures that water flowing proximate to lips 610 is channeled towards the center of bay blanket 500 before it passes to a next bay blanket 500. This reduces the chances of leaks in overlapping regions of bay blankets where bay blankets are shingled over with respect to each other.

Figure 14:
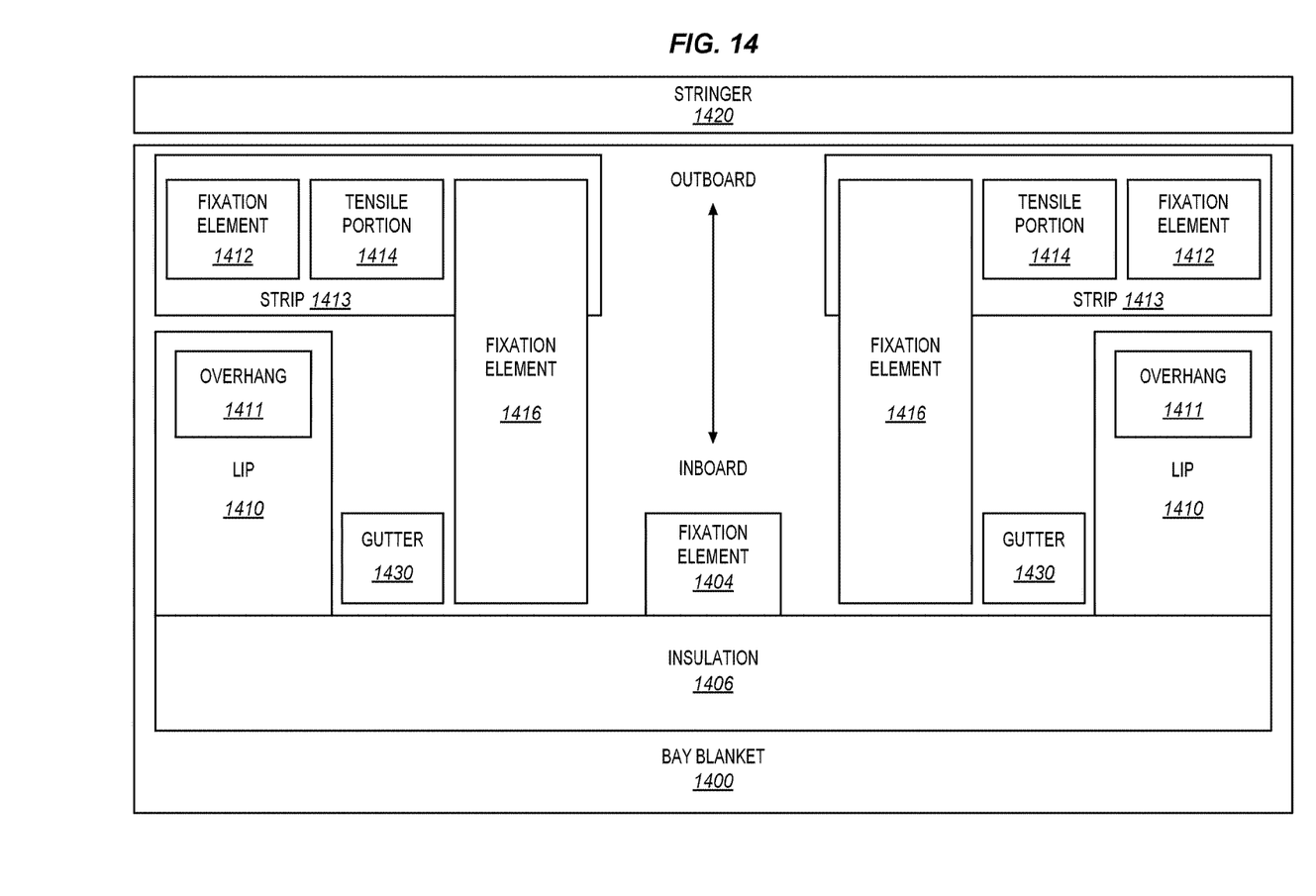
FIG. 14 is a block diagram of a bay blanket in an exemplary embodiment.

FIG. 14 is a block diagram of a bay blanket 1400 in an exemplary embodiment. In FIG. 14, bay blanket 1400 includes insulation 1406, to which fixation element 1404 and lips 1410 are attached. Lips 1410 include overhangs 1411. Attached to overhangs 1411 are strips 1413, which include fixation elements 1412 for attaching the strip (and bay blanket 1400) to a stringer 1420. Strips 1413 also include tensile portions 1414, and fixation elements 1416 which affix strips 1413 to insulation 1406. When insulation 1406 hangs from strips 1413 and fixation elements 1404 and 1412, it depresses to form gutters 1430, which channel incoming water through them. While bay blanket 1400 is in operation, water drains within gutters 1430, deflecting off of lips 1410 without spilling off of the side of bay blanket 1400.

Figure 15:
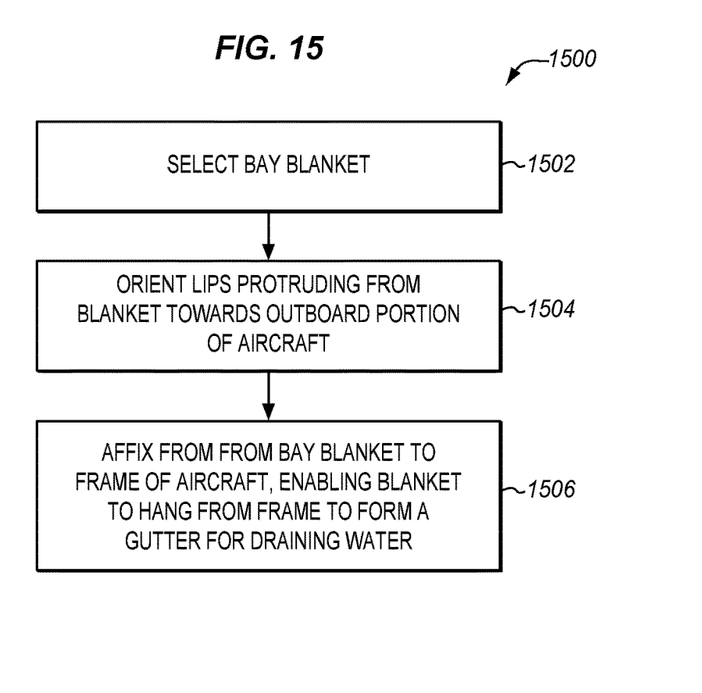
FIG. 15 is a flowchart illustrating a method for installing a bay blanket in an exemplary embodiment.

Further details of the operations of bay blankets discussed herein will be discussed with regard to method 1500 of FIG. 15. FIG. 15 is a flowchart illustrating a method for installing a bay blanket in an exemplary embodiment. The steps of method 1500 are described with reference to bay blanket 1400 of FIG. 14, but those skilled in the art will appreciate that method 1500 may be performed in other environments with bay blankets implementing similar innovations. The steps of the flowcharts described herein are not all inclusive and may include other steps not shown. The steps described herein may also be performed in an alternative order.

According to FIG. 15, a bay blanket 1400 is selected for installation (step 1502). Lips 1410 from bay blanket 1400 are identified, and are oriented towards an outboard portion of aircraft 100 (e.g., towards skin 210) (step 1504). Bay blanket 1400 is also affixed to the frame of aircraft 100 via fixation elements (e.g., 612, 502), enabling bay blanket 1400 to hang from the frame of aircraft 100 and form a gutter for draining water. The method may further comprise folding corners of bay blanket 1400 towards a center of an outboard portion of the bay blanket, and affixing the corners to the insulation 1406 of bay blanket 1400.

In a further embodiment, the method may further comprise repeating the above steps, once per bay blanket, while overlapping the ends of the bay blankets to form a shingled pattern. That is, blankets that are vertically higher are installed so that their lower portions extend over upper portions of blankets that are vertically lower. The lower portions are further outboard than the upper portions.

Figure 16:
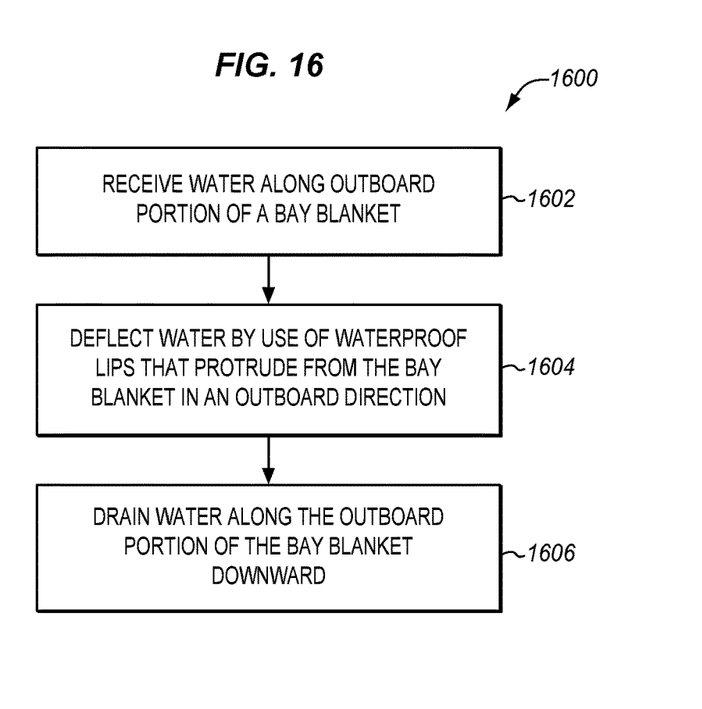
FIG. 16 is a flowchart illustrating a method for draining water via a bay blanket in an exemplary embodiment.

FIG. 16 is a flowchart illustrating a method 1600 for draining water via a bay blanket 500 in an exemplary embodiment. Method 1600 includes receiving water along an outboard surface of a bay blanket 500 comprising insulation 506 (step 1602). Method 1600 further includes deflecting water traveling laterally across the bay blanket back towards a center of the bay blanket by use of waterproof lips 610 that protrude from the insulation 506 in an outboard direction towards a frame of the aircraft 100. The waterproof lips 610 are integrated into the insulation 506 at left and right sides of the insulation 506 (step 1604). Furthermore, method 1600 includes draining the water along the outboard surface of the bay blanket 500 downward towards a drain of the aircraft (step 1606). In a further embodiment, step 1606 may include draining the water across shingled bay blankets such that the water traverses from an upper bay blanket to a lower bay blanket that is shingled under the upper bay blanket. This technique of draining may further include redirecting draining water from corners of a bay blanket towards the center of the bay blanket (e.g., as shown via the structure of FIGS. 11-13).

Figure 17:
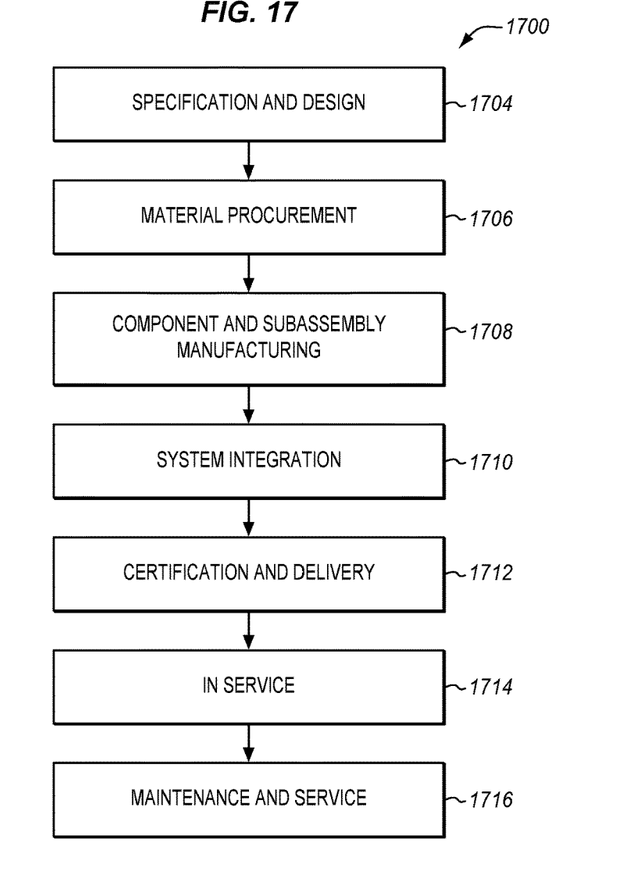
FIG. 17 is a flow diagram of aircraft production and service methodology in an exemplary embodiment.
Figure 18:
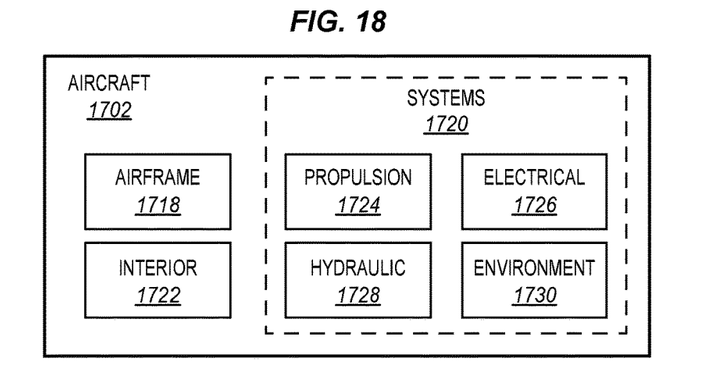
FIG. 18 is a block diagram of an aircraft in an exemplary embodiment.

Referring more particularly to the drawings, embodiments of the disclosure may be described in the context of an aircraft manufacturing and service method 1700 as shown in FIG. 17 and an aircraft 1702 as shown in FIG. 18. During pre-production, exemplary method 1700 may include specification and design 1704 of the aircraft 1702 and material procurement 1706. During production, component and subassembly manufacturing 1708 and system integration 1710 of the aircraft 1702 takes place. Thereafter, the aircraft 1702 may go through certification and delivery 1712 in order to be placed in service 1714. While in service by a customer, the aircraft 1702 is scheduled for routine maintenance and service 1716 (which may also include modification, reconfiguration, refurbishment, and so on).

In various embodiments, the improved techniques and components described herein may be utilized such that materials for bay blankets are procured in stage 1706, then utilized in stage 1708 in order to assemble the materials into a bay blanket in stage 1708. In stage 1710, the assembled bay blanket may be attached to a frame of an aircraft, and in stage 1714 the bay blanket within the aircraft enhances drainage within an interior 1722 while the aircraft is operating. In stage 1716, the bay blanket may be replaced or repaired by technicians for the aircraft.

Each of the processes of method 1700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 17, the aircraft 1702 produced by exemplary method 1700 may include an airframe 1718 with a plurality of systems 1720 and an interior 1722. Examples of high-level systems 1720 include one or more of a propulsion system 124, an electrical system 1726, a hydraulic system 1726, and an environmental system 1730. Any number of other systems may be included. Although an aerospace example is shown, the principles of the invention may be applied to other industries, such as the automotive industry.

Apparatus and methods embodied herein may be employed during any one or more of the stages of the production and service method 1700. For example, components or subassemblies corresponding to production stage 1708 may be fabricated or manufactured in a manner similar to components or subassemblies produced while the aircraft 1702 is in service. Also, one or more apparatus embodiments, method embodiments, or a combination thereof may be utilized during the production stages 1708 and 1710, for example, by substantially expediting assembly of or reducing the cost of an aircraft 1702. Similarly, one or more of apparatus embodiments, method embodiments, or a combination thereof may be utilized while the aircraft 1702 is in service, for example and without limitation, to maintenance and service 1716.

Although specific embodiments are described herein, the scope of the disclosure is not limited to those specific embodiments. The scope of the disclosure is defined by the following claims and any equivalents thereof.

The invention claimed is:

1. An apparatus comprising:
a bay blanket configured to insulate an aircraft, the bay blanket comprising:
insulation;
a first waterproof lip that protrudes from the insulation in an outboard direction towards a frame of the aircraft and extends along a length of an aftward leftward side of the bay blanket that is perpendicular to the outboard direction, the first waterproof lip curling over the insulation towards a center of the bay blanket;
a second waterproof lip that protrudes from the insulation in the outboard direction towards the frame of the aircraft along a length of a foreward rightward side of the bay blanket that is perpendicular to the outboard direction, the second waterproof lip curling over the insulation towards a center of the bay blanket;
first fixation elements that are configured to affix the first and second waterproof lips of the bay blanket to the aircraft; and
second fixation elements that are configured to affix a center of the bay blanket to the aircraft,
wherein the bay blanket is configured to hang from the fixation elements forming a leftward gutter that channels water in the aircraft proximate to the first waterproof lip, and a rightward gutter that channels liquid water in the aircraft proximate to the second waterproof lip.

2. The apparatus of claim 1 wherein: the first fixation elements comprise hook-and-loop fastener material.

3. The apparatus of claim 1 wherein:
the bay blanket further comprises strips that are each attached between one of the waterproof lips and the insulation.

4. The apparatus of claim 3 further comprising:
multiple additional fixation elements that are configured to affix the strips to the aircraft.

5. The apparatus of claim 1 wherein:
each waterproof lip further comprises an overhang that extends in a direction parallel to an outboard surface of the insulation, and the overhang of the first waterproof lip faces the overhang of the second waterproof lip.

6. The apparatus of claim 5 further comprising:
a channeling element that continues along a length of the overhang beneath the overhang,
the channeling element comprises a porous material that channels water underneath the overhang when the overhang sags downward towards the insulation.

7. The apparatus of claim 1 wherein:
corners at ends of the lengths of the bay blanket are folded towards a center of the bay blanket and affixed to the insulation.

8. The apparatus of claim 7 wherein:
each of the corners is affixed to the insulation by tape.

* * * * *